United States Patent
Ransom

(10) Patent No.: US 8,025,323 B2
(45) Date of Patent: Sep. 27, 2011

(54) RATCHETING LEVEL COMPENSATOR FOR ROBOTIC END-OF-ARM TOOL

(75) Inventor: Lance T. Ransom, Essex (CA)

(73) Assignee: GM Global Technology Operations LLC, Detroit, MI (US)

( * ) Notice: Subject to any disclaimer, the term of this patent is extended or adjusted under 35 U.S.C. 154(b) by 410 days.

(21) Appl. No.: 12/257,701

(22) Filed: Oct. 24, 2008

(65) Prior Publication Data

US 2010/0101355 A1    Apr. 29, 2010

(51) Int. Cl.
*B25J 15/06* (2006.01)
*B66C 1/02* (2006.01)
(52) U.S. Cl. .................. 294/65; 901/40; 901/45
(58) Field of Classification Search ............ 294/64.1, 294/65, 87.7, 87.12, 88, 100, 115, 87.1; 901/40, 901/45
See application file for complete search history.

(56) References Cited

U.S. PATENT DOCUMENTS

| | | | | |
|---|---|---|---|---|
| 3,219,377 A | * | 11/1965 | Benigene | 294/19.1 |
| 4,572,564 A | * | 2/1986 | Cipolla | 294/88 |
| 4,846,517 A | * | 7/1989 | Boke et al. | 294/65 |
| 4,869,489 A | * | 9/1989 | Wirz et al. | 271/90 |
| 5,403,057 A | * | 4/1995 | Sugito et al. | 294/119.1 |
| 6,161,886 A | * | 12/2000 | Furuya et al. | 294/64.1 |
| 6,168,220 B1 | * | 1/2001 | Schmalz et al. | 294/64.1 |
| 7,281,739 B2 | * | 10/2007 | Kniss | 294/65 |

FOREIGN PATENT DOCUMENTS

| CN | 2070230 U | 1/1991 |
|---|---|---|
| CN | 2221545 Y | 3/1996 |

OTHER PUBLICATIONS

Letter reporting Chinese Office Action dated Jan. 25, 2011 for Chinese application 200910207337.9 corresponding to U.S. Appl. No. 12/257,701.

* cited by examiner

*Primary Examiner* — Dean Kramer

(57) ABSTRACT

A ratcheting end-of-arm (EOM) tool having a spring-loaded level compensator, a distally mounted gripper, and a ratcheting mechanism. In operation, upon a selectively adequate contact between the gripper and a payload, the ratcheting mechanism is engaged which holds the position of the gripper with respect to the robot arm at a fixed position, independent of spring biasing. Upon conclusion of robotic movement of the payload, the gripper is deactivated, the ratcheting mechanism is disengaged, and the spring returns the ratcheting EOA tool to its nominal configuration.

6 Claims, 4 Drawing Sheets

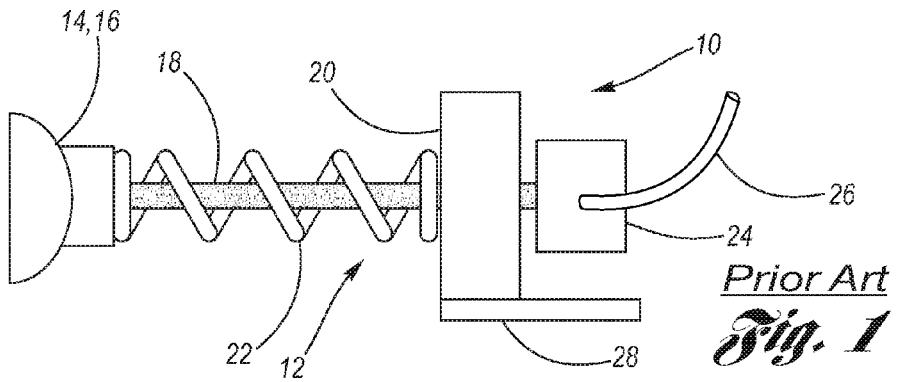
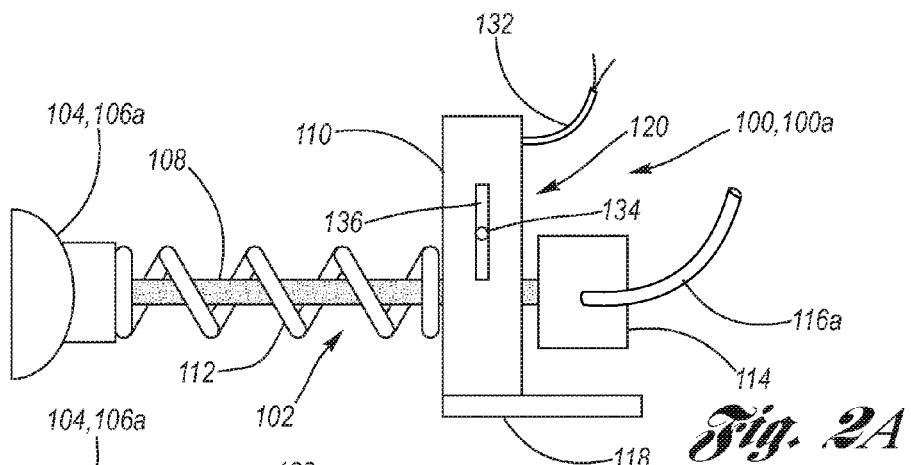
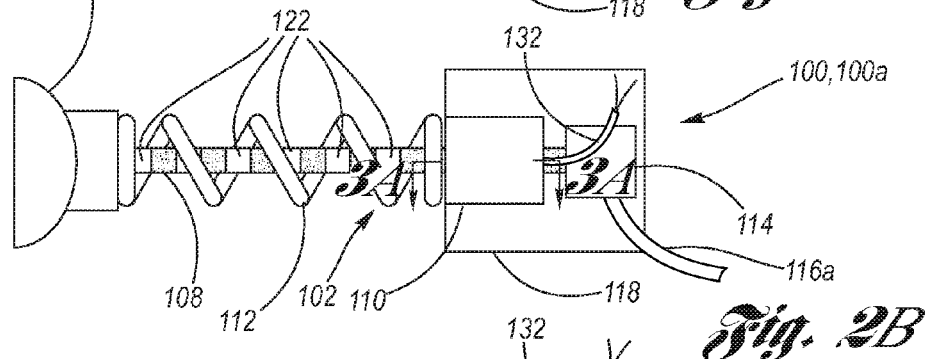
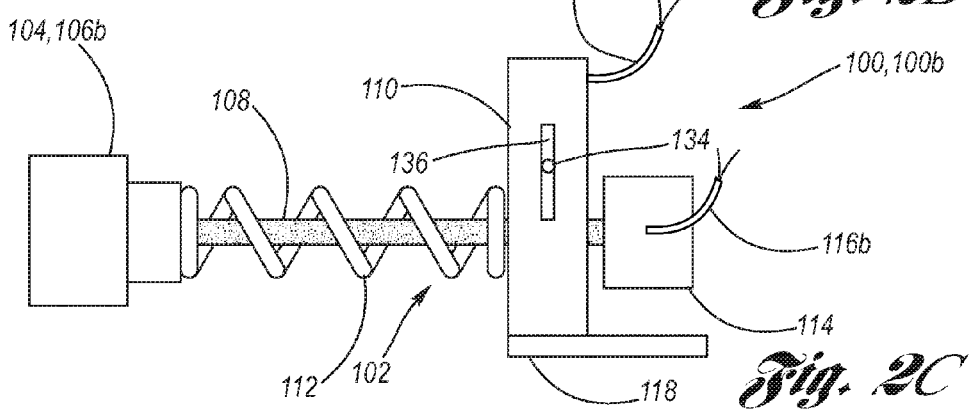

RATCHETING LEVEL COMPENSATOR FOR ROBOTIC END-OF-ARM TOOL

TECHNICAL FIELD

The present invention relates, in general, to flexible manufacturing, and in particular to robotic end-of-arm tools which are elements of flexible manufacturing systems.

BACKGROUND OF THE INVENTION

Flexible manufacturing involves a work machine, such as a six-axis articulating robot, typically placed at each work station. The logistical supports in flexible manufacturing consist of a central controller or computer to manage the work flow and a material handling systems to provide supplies as needed to the different work stations. In these systems the logistical portion can be programmed for different parts and volumes of parts, making the configuration more flexible.

The most powerful form of flexible manufacturing utilizes robots in the material handling portion of the system. This increases the programming capability of the material handling portion of the logistical support system. These can have very complicated forms of programming regarding the routing and scheduling portions of the material handling process. The flexibility of the robots is determined by the sophistication of the arms of the robot. Much research and development has been done with robotic movement, employing similar technologies to those used in multi-axis machinery. This capability can be used to precisely align part placement and coordinate other arm movements.

One limitation of conventional industrial robots is the interface between the robot and the payload the robot is manipulating. Typically, the robot is uniquely configured to suit a particular end-of-arm tool that would provide the most versatility in the particular application. What this means in practice, however, is that the end-of-arm tool must be redesigned for different applications. When production runs are scheduled, they must include steps for frequently changing of the end-of-arm tools to meet the variety of various payloads being used in the production run.

FIG. 1 is an example of a prior art end-of-arm (EOA) tool 10, wherein a spring-loaded level compensator 12 has a distally mounted gripper 14, as for example in the form of a vacuum assisted suction cup 16, but this may be otherwise, such as an electromagnet. The spring-loaded level compensator 12 is in the form of a shaft 18 which is slidable and guidably mounted relative to a housing 20 and biased by a spring 22 such that the nominal position is for the gripper 14 to be remotely positioned with respect to the housing 20. The shaft 18 has a port member 24 at its proximal end which is interfaced with an actuation source for the gripper 14, as for example an air line 26 for a suction cup gripper or an electrical feed for an electromagnetic gripper. A base plate 28 is connected with the housing 20, wherein the base plate provides a suitable connection platform to a robotic arm.

In operation, with the EOA tool 10 at its nominal configuration, a robot to which the ratcheting EOA tool is connected, maneuvers so that the gripper 14 approaches a payload of arbitrary shape. Upon a selectively adequate pressed contact as between the gripper and the payload, wherein as the shaft slides relative to the housing the spring compresses, the gripper is actuated to grip the payload, whereupon the robot moves the payload as determined. Upon conclusion of robotic movement of the payload, the gripper is deactivated, and the spring returns the EOA tool to its nominal configuration.

Another limitation of conventional robots is that spring-loaded end-of-arm tools, which allow for surface irregularity (level) compensation of payloads of differing geometric shapes, utilize spring-loaded level compensators that always apply spring biasing to the shaft, which biasing has the disadvantage of tending to always force the shaft to its nominal position.

Accordingly, what remains needed in the art is an end-of-arm tool spring-load level compensator which has sufficient capability and flexibility to manipulate a wide variety of payload geometries, yet without requiring continuous spring biasing.

SUMMARY OF THE INVENTION

The present invention provides an end-of-arm tool spring-loaded level compensator having similarities with the prior art as described in FIG. 1, but which has sufficient capability and flexibility to manipulate a wide variety of payload geometries, yet without requiring continuous spring biasing via selective operation of a ratcheting mechanism.

The ratcheting end-of-arm (EAO) tool according to the present invention has a spring-loaded level compensator having a distally mounted gripper, as for example in the form of a vacuum assisted suction cup or an electromagnet, and additionally includes a ratcheting mechanism for selectively locking sliding movement of the shaft with respect to the shaft housing to which it is slidably mounted. The ratcheting mechanism is selectively engaged, as for example by the position of a detent with respect to slots of the shaft as dictated by a detent movement agency.

In operation, with the ratcheting EOA tool at its nominal configuration and the ratcheting mechanism disengaged, a robot to which the ratcheting EOA tool is connected, maneuvers so that the gripper approaches a payload of arbitrary shape, whereupon the gripper is pressed to the payload and the shaft slides relative to the shaft housing while a shaft spring compresses. Upon a selectively adequate pressed contact as between the gripper and the payload, the ratcheting mechanism is engaged which locks the position of the gripper with respect to the robot arm at a fixed position, independent of the shaft spring. The gripper is actuated to grip the payload, whereupon the robot moves the payload as determined. Upon conclusion of robotic movement of the payload, the gripper is deactivated, the ratcheting mechanism is disengaged (i.e., the shaft is unlocked with respect to the shaft housing), and the shaft spring returns the ratcheting EOA tool to its nominal configuration.

Accordingly, it is an object of the present invention to provide an end-of-arm tool spring-loaded level compensator which has sufficient capability and flexibility to manipulate a wide variety of payload geometries, yet without requiring continuous spring biasing via selective operation of a ratcheting mechanism.

This and additional objects, features and advantages of the present invention will become clearer from the following specification of a preferred embodiment.

BRIEF DESCRIPTION OF THE DRAWINGS

FIG. 1 is a side elevational view, showing an EOA tool according to the prior art, having, by way of example, a suction cup gripper.

FIG. 2A is a side elevational view, showing ratcheting EOA tool according to the present invention, having a suction cup gripper.

FIG. 2B is a top plan view, showing the ratcheting EOA tool of FIG. 2A.

FIG. 2C is a side elevational view, showing ratcheting EOA tool according to the present invention, having an electromagnetic gripper.

DESCRIPTION OF THE PREFERRED EMBODIMENT

Figures 3A, 3B:
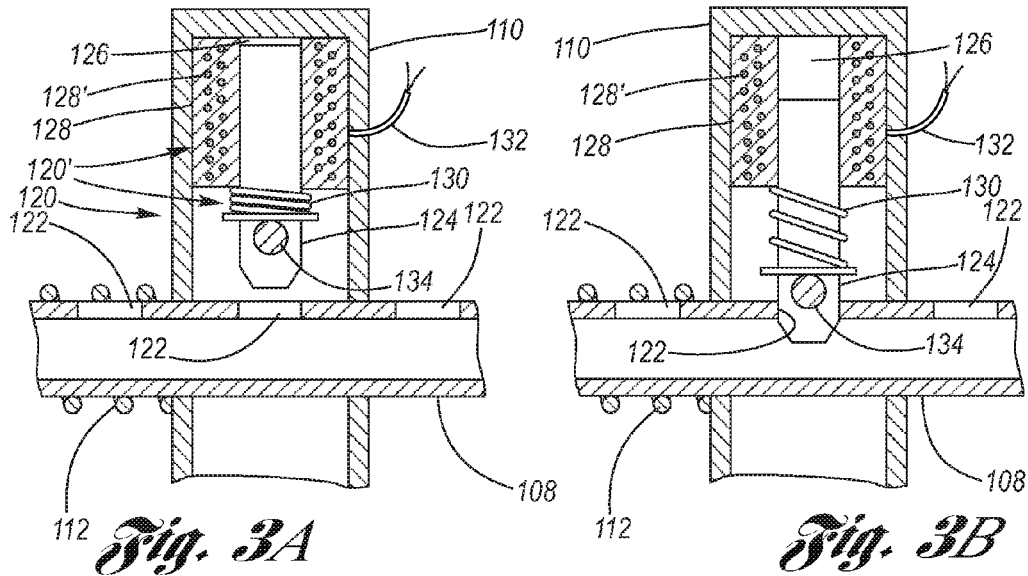
FIG. 3A is a sectional view, seen along line 3A-3A of FIG. 2B, showing the ratcheting mechanism according to the present invention in its disengaged mode of operation.
FIG. 3B is a sectional view as in FIG. 3A, now showing the ratcheting mechanism according to the present invention in its engaged mode of operation.

Referring now to the Drawing, FIGS. 2A through 6C depict various aspects of a ratcheting end of arm (EOA) tool 100 according to the present invention.

Referring firstly to FIGS. 2A and 2B, a ratcheting EOA tool 100, 100a is depicted.

The end-of-arm (EOA) tool 100a includes a spring-loaded level compensator 102 having a distally mounted gripper 104, as for example the depicted vacuum assisted suction cup 106a. The spring-loaded level compensator 102 includes a shaft 108 which is slidably and guidably mounted, to a shaft housing 110, wherein the shaft is biased by a shaft spring 112 relative to the shaft housing such that the nominal position is for the gripper 104 is be remotely positioned with respect to the shaft housing. The shaft 108 has a port member 114 at its proximal end which is interfaced with an actuation source for the gripper 104, wherein in the case of the suction cup gripper 106a, this takes the form of an air line 116a interconnected with a vacuum source. A base plate 118 is connected with the shaft housing 110, wherein the base plate provides a suitable connection platform to a robotic arm (not shown, but visible schematically at FIGS. 6 through 6C).

With additional reference to FIGS. 3A and 3B, a ratcheting mechanism 120 is connected with the shaft housing 110, which is structured to selectively ratchet with respect to slots 122 formed in the shaft 108. A detent 124 is slidably and guidingly received in a guide bore 126 of a ratchet solenoid 128, wherein the detent is biased by a detent spring 130 away from the ratchet solenoid, and is composed of a magnetizable material which is attracted by the ratchet solenoid when the ratchet solenoid (via its coil 128') is energized by an external circuit 132 (shown broken away; for example, a circuit delivering 24V D.C.). The movement of the detent 124 is guided with respect to the shaft housing 110 via a pair of opposed guide bars 134 which traveling respective slots 136 (only one of each being visible in the views).

As can be discerned by comparative reference to FIGS. 3A and 3B, the detent 124 is biased by the detent spring 130 toward the shaft 108, such that the biasing pushes the detent into an aligned slot 122, whereupon the shaft is locked in position relative to the shaft housing 110. However, when the ratchet solenoid 128 is energized, the magnetic field pulls on the detent 124, overcoming the biasing of the detent spring130, sliding into the guide bore 126 and out of the slot 122, thereby unlocking the shaft such that the shaft is able to slide free of interference by the ratcheting mechanism 120. The ratcheting solenoid and the detent spring may be collectively regarded as an example of a detent movement agency 120'.

Turning attention now briefly to FIG. 2C, a ratcheting EOA tool 100, 100b is depicted wherein parts are identical to that of FIGS. 2A and 2B, wherein now the gripper 104 is in the form of an electromagnet 106b the coils of which being selectively energized by an external circuit 116b. It is to be understood that the ratcheting EOA tool 100 is operable with any suitable gripper.

Figure 4A:
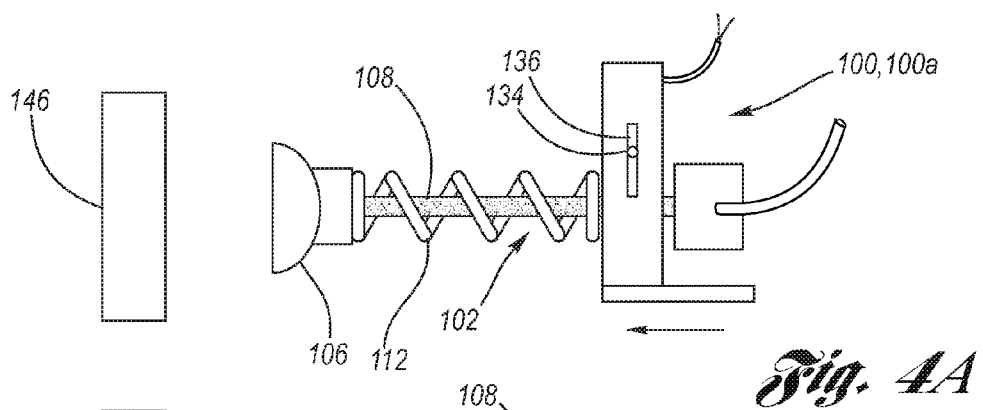
FIGS. 4A through 4C depict progressive stages of engagement by the ratcheting EOA tool of the present invention with respect to a payload.
Figure 4B:
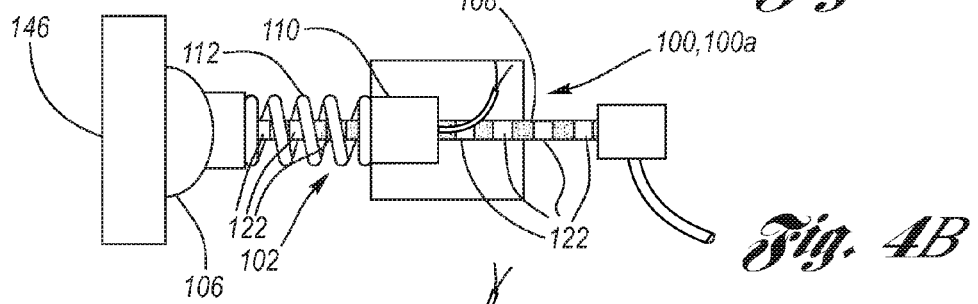
Figure 4C:
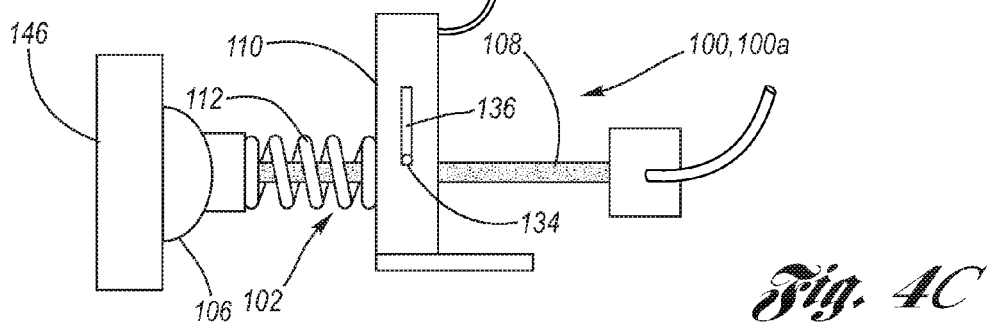
Figure 5:
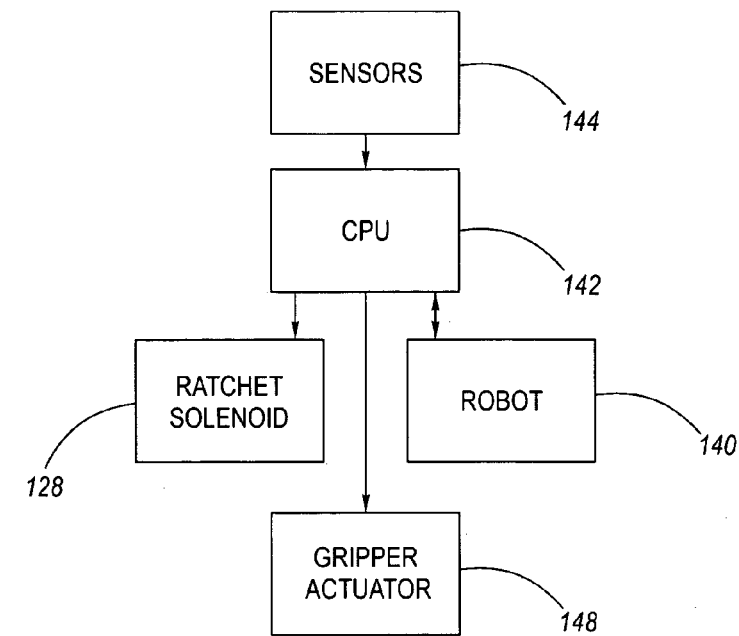
FIG. 5 is a block diagram of an example of execution components for the ratcheting EOA tool according to the present invention.

Referring now to FIGS. 4A through 5, an example of operation of the ratcheting EOA tool 100 will be described using merely by way of illustration the ratcheting EOA tool 100a of FIGS. 2A and 2B.

With the ratcheting EOA tool 100a at its nominal configuration (i.e., the distal end of the shaft (the gripper location) is positioned at its farthest from the shaft housing by biasing of the shaft spring) and the ratcheting mechanism 120 disengaged(meaning the ratcheting solenoid 128 is energized and pulling on the detent 124 to keep it clear of interference with the slots 122 of the shaft 108, as per FIG. 3A), a robot 140 to which the ratcheting EOA tool is connected, maneuvers, pursuant to instruction by programming of a central processing unit (CPU) 142 and responsive to input of sensors144, the gripper 106 to approach a payload 146 of arbitrary shape (see FIG. 4A). Upon a selectively adequate pressed contact as between the gripper and the payload, where during the shaft spring 112 is compressed and the shaft 108 slides with respect to the shaft housing 110 (see FIG. 4B), the ratcheting mechanism 120 is engaged by the ratcheting solenoid 128 being de-energized and the biasing of the detent spring 130 forcing the detent 124 toward the shaft 108 and into an aligned slot 122, as per FIG. 3B, whereupon now the shaft is locked positionally with respect to the shaft housing, even though the shaft spring 112 is compressed and biasing upon the shaft (see FIG. 4C). The gripper is actuated by a gripper actuator 148, as for example a vacuum source communicating with the suction cup, to thereby grip the payload, whereupon the robot moves the payload as determined by the CPU. Upon conclusion of robotic movement of the payload, the gripper is deactivated by CPU command to the gripper actuator, the ratcheting mechanism 120 is again disengaged by energization of the ratchet solenoid, and the shaft spring returns the ratcheting EOA tool to its nominal configuration, ready for the next robotic task to be assigned by the CPU.

Figure 6:
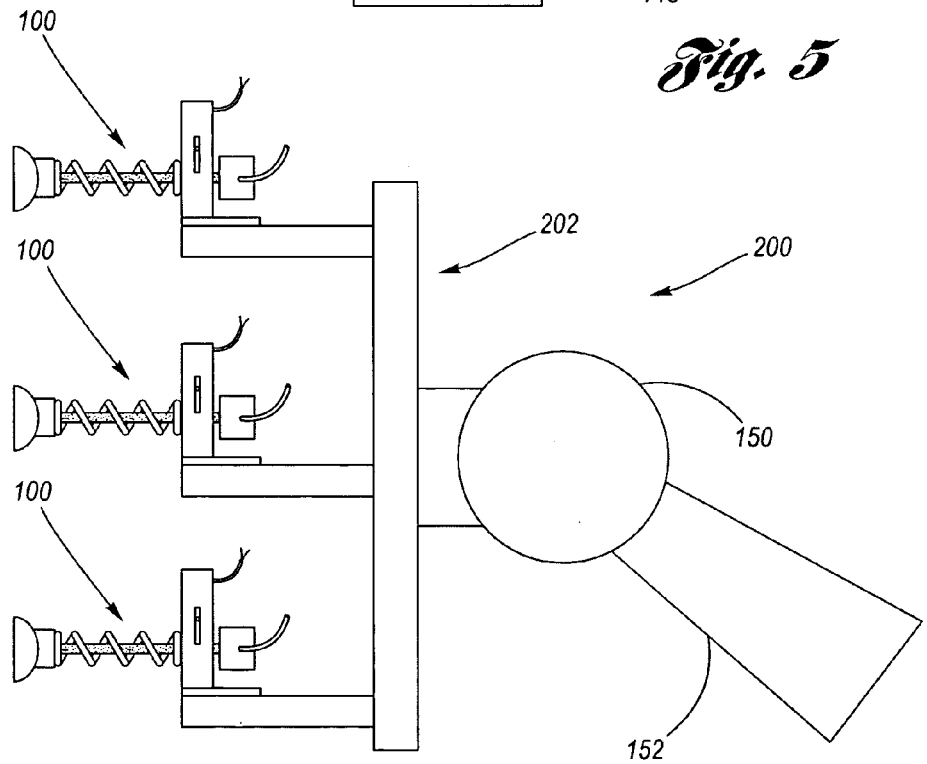
FIG. 6 is a side elevational view of a tool gang assembly of ratcheting EOA tools according to the present invention.
Figure 6A:
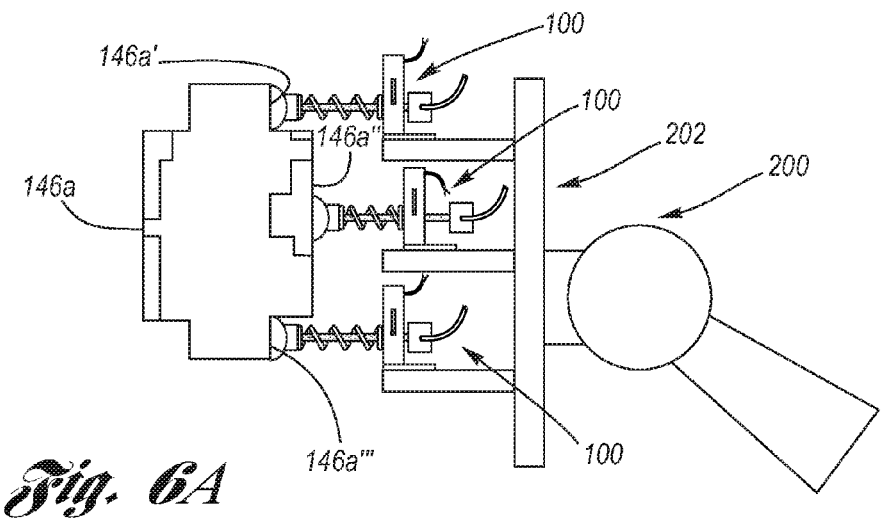
FIGS. 6A through 6C depict side views of gripping engagement of the tool gang assembly ratcheting EOA tools of FIG. 6 with respect to variously shaped payloads.
Figure 6B:
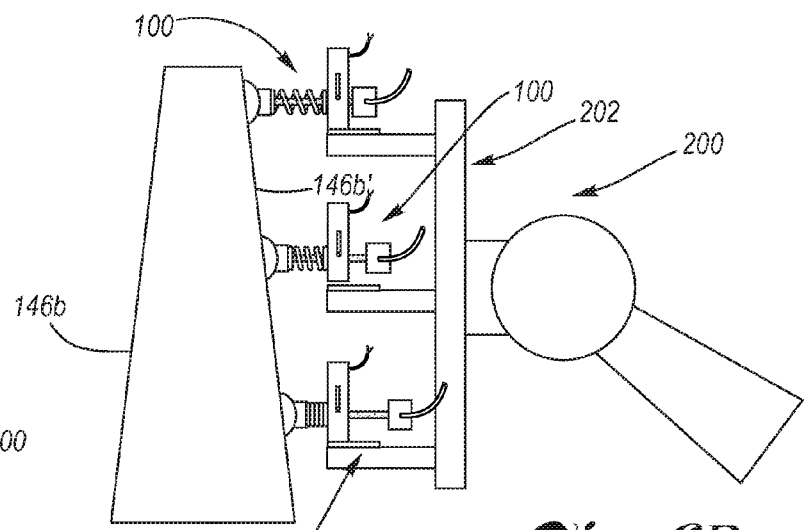
Figure 6C:
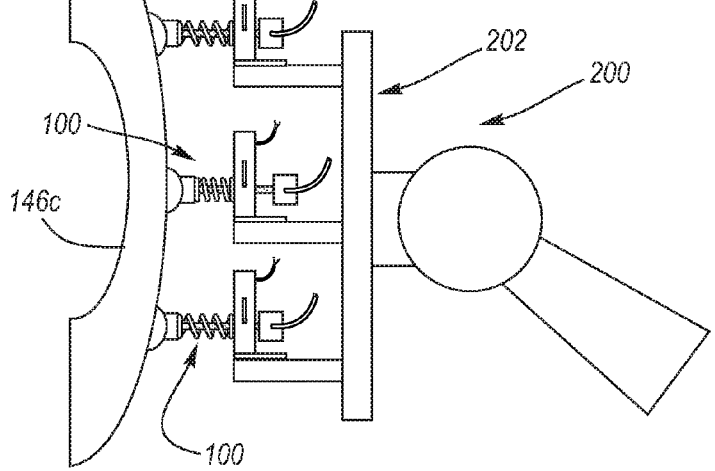

Turning attention now to FIGS. 6 through 6C, implementation of the ratcheting EOA tool 100 in a tool gang assembly 200 will be discussed.

A tool fixture 202 is configured for holding a plurality of ratcheting EOA tools 100. Merely by way of example, FIG. 6 shows a tool gang assembly 200 in the form of three ratcheting EOA tools 100, but there may be any number, and the alignment maybe be in one dimensions (i.e., aligned along an axis), two dimensions (i.e., arranged at locations on around the two axes of a plane, or three dimensions (i.e., at locations anywhere distributed over three axes of a volume of space). In the example of FIG. 6, the tool fixture is connected to a wrist 150 of a robotic arm 152.

FIGS. 6A through 6C depict various applications of the tool gang 200 according to the present invention, wherein the applications are intended merely for illustration, and do not represent a limitation of applications.

At FIG. 6A, a payload 146a has an irregular rectilinear shape in which the grippers must interface with spatially offset surfaces 146a', 146a", 146a'". In this application, the ratcheting EOA tools 100 each utilize their respective leveling compensators (i.e., 102 of FIG. 2A) and ratcheting mechanisms (i.e., 120 of FIG. 2A) to accommodate the payload.

At FIG. 6B, a payload 146b has an irregular shape in which the grippers must interface with an inclined surface 146b'. In this application, the ratcheting EOA tools 100 each utilize their respective leveling compensators (i.e., 102 of FIG. 2A) and ratcheting mechanisms (i.e., 120 of FIG. 2A) to accommodate the payload.

At FIG. 6C, a payload 146c has an irregular shape in which the grippers must interface with a curvilinear surface 146c'. In this application, the ratcheting EOA tools 100 each utilize their respective leveling compensators (i.e., 102 of FIG. 2A) and ratcheting mechanisms (i.e., 120 of FIG. 2A) to accommodate the payload.

To those skilled in the art to which this invention appertains, the above described preferred embodiments may be subject to change or modification. Such change or modification can be carried out without departing from the scope of the invention, which is intended to be limited only by the scope of the appended claims.

The invention claimed is:

1. A ratcheting end-of-arm tool for robotic arms, comprising:
   a level compensator comprising:
      a housing;
      a shaft slidably mounted to said housing;
      a gripper mounted to a distal end of said shaft;
      a shaft spring biasing said shaft with respect to said housing such that said distal end of said shaft is biased away from said housing; and
   a ratcheting mechanism, comprising:
      said shaft having a plurality of slots formed therein;
      a detent; and
      a detent movement agency to selectively locate the detent in a slot of said plurality of slots in order to lock position of the shaft with respect to the housing;
   wherein said detent movement agency comprises:
      said detent being composed of a magnetic material;
      a detent spring biasing said detent toward said shaft; and
      a solenoid which when energized magnetically pulls said detent away from said shaft, overcoming the biasing of said detent spring.

2. The ratcheting end of arm tool of claim 1, wherein the gripper is adapted to grip payloads; further comprising a gripper actuator which selectively actuates gripping of the payloads by the gripper.

3. A tool gang assembly for a robotic arm, comprising:
   a tool fixture adapted for connection to a robotic arm;
   a plurality of ratcheting end-of-arm tools connected to said tool fixture, each ratcheting end-of-arm tool comprising:
      a level compensator comprising:
         a housing;
         a shaft slidably mounted to said housing;
         a gripper mounted to a distal end of said shaft;
         a shaft spring biasing said shaft with respect to said housing such that said distal end of said shaft is biased away from said housing; and
      a ratcheting mechanism, comprising:
         said shaft having a plurality of slots formed therein;
         a detent; and
         a detent movement agency to selectively locate the detent in a slot of said plurality of slots in order to lock position of the shaft with respect to the housing.

4. The tool gang assembly of claim 3, wherein said detent movement agency comprises:
   said detent being composed of a magnetic material;
   a detent spring biasing said detent toward said shaft; and
   a solenoid which when energized magnetically pulls said detent away from said shaft, overcoming the biasing of said detent spring.

5. The tool gang assembly of claim 4, wherein the gripper is adapted to grip payloads; further comprising a gripper actuator which selectively actuates gripping of the payloads by the gripper.

6. A method of operating an end-of-arm tool of a robotic arm, comprising the steps of:
   connecting a gripper to a shaft;
   slidably connecting the shaft to a robotic arm;
   biasing the shaft;
   maneuvering the gripper into contact with a payload;
   pressing the at gripper against the payload against the direction of biasing of the shaft, wherein the shaft slides with respect to the connection of the gripper to the shaft;
   locking positional movement of the shaft with respect to the connection;
   gripping the payload by the gripper;
   moving the payload via movement of the robotic arm;
   unlocking the positional movement of the shaft with respect to the connection; and
   releasing the gripping of the payload by the gripper;
   wherein the payload is gripped and grippingly released by a plurality of grippers, wherein said steps of locking and unlocking are performed independently with respect to each gripper of the plurality of grippers.

* * * * *